US011176070B2

(12) United States Patent
De Haas et al.

(10) Patent No.: US 11,176,070 B2
(45) Date of Patent: Nov. 16, 2021

(54) PUSH PULL RINGING SUPPRESSION CIRCUIT

(71) Applicant: NXP B.V., Eindhoven (NL)

(72) Inventors: Clemens De Haas, Ewijk (NL); Matthias Muth, Stelle (DE); Hartmut Habben, Hamburg (DE); Anthony Adamson, Nijmegen (NL)

(73) Assignee: NXP B.V., Eindhoven (NL)

( * ) Notice: Subject to any disclaimer, the term of this patent is extended or adjusted under 35 U.S.C. 154(b) by 789 days.

(21) Appl. No.: 15/412,659

(22) Filed: Jan. 23, 2017

(65) Prior Publication Data

US 2017/0262394 A1    Sep. 14, 2017

(30) Foreign Application Priority Data

Mar. 11, 2016    (EP) .................................... 16159863

(51) Int. Cl.
*G06F 13/364* (2006.01)
*H04L 25/02* (2006.01)
*H04L 12/40* (2006.01)
*G06F 13/42* (2006.01)

(52) U.S. Cl.
CPC ........ *G06F 13/364* (2013.01); *G06F 13/4282* (2013.01); *H04L 12/40032* (2013.01); *H04L 25/0272* (2013.01); *H04L 25/0278* (2013.01); *H04L 2012/40215* (2013.01); *H04L 2012/40273* (2013.01)

(58) Field of Classification Search
CPC ..................................................... G06N 20/00
See application file for complete search history.

(56) References Cited

U.S. PATENT DOCUMENTS

| | | | |
|---|---|---|---|
| 7,113,586 B2 * | 9/2006 | Silver | H04M 1/57 379/373.01 |
| 8,593,202 B2 | 11/2013 | Mori et al. | |
| 9,223,736 B2 | 12/2015 | De Haas | |
| 9,495,317 B2 | 11/2016 | Metzner et al. | |
| 2009/0279617 A1 | 11/2009 | Mori et al. | |
| 2014/0156893 A1 * | 6/2014 | Monroe | G06F 13/372 710/117 |
| 2016/0036604 A1 | 2/2016 | Mori et al. | |

FOREIGN PATENT DOCUMENTS

| | | | |
|---|---|---|---|
| DE | 102010043484 A1 | 10/2012 | |
| JP | 5498527 B2 | 5/2014 | |
| JP | 5543402 B2 | 7/2014 | |

OTHER PUBLICATIONS

U.S. Appl. No. 15/412,556, filed Jan. 23, 2017.

* cited by examiner

*Primary Examiner* — Henry Tsai
*Assistant Examiner* — Juanito Borromeo

(57) ABSTRACT

A circuit is provide comprising a first input coupled to a transmit data input of a bus transceiver; and a first output coupled to a bus. The circuit is configured to be coupled in parallel with the bus transceiver. The circuit is further configured to, in response to a dominant to recessive transition on the transmit data input, lower an impedance of the bus.

20 Claims, 6 Drawing Sheets

PUSH PULL RINGING SUPPRESSION CIRCUIT

FIELD

The present application relates to bus operation and in particular to a ringing suppression circuit

BACKGROUND

A Controller Area Network (CAN) bus is a multi-master serial bus that connects one or more nodes in a network. The CAN bus is typically used in automotive and industrial automation applications, however may be applied to other applications. Use of the CAN bus is governed by various ISO standards, for example ISO11898-1 for the CAN protocol, ISO 11898-2 for high speed CAN Physical Layer and ISO 11898-3 for low speed or fault tolerant CAN Physical Layer.

Current CAN buses may able to support varying data rates, in some cases the range may be between 1 Mb/s and 10 Mb/s. However the support of such data rates is dependent on the network being correctly terminated. In current networks, this termination may comprise, for example a 120Ω termination resistance at the end nodes of the network and intermediate nodes being connected to the bus via stubs of a sufficiently short length. The termination is there to prevent reflections on the bus that may distort or compromise the integrity of the signaling on the bus.

The topology of the CAN bus network may comprise multiple nodes located at varying distances to the terminating resistances at the end nodes. The nodes furthest from the terminating resistors may cause reflection when one of the nodes transmit which may cause ringing on the bus. This may reduce the maximum data rate at which the bus may operate correctly.

Traditionally other factors, such as the length of the bus cable, limited the data rate to a speed below the speed at which ringing would become an issue. However advancement in the CAN bus protocol, for example CAN bus flexible data rate (CAN FD), have increased the possible data rate to a point at which ringing becomes influential.

It thus becomes of interest to address the termination resistance and/or the presence of ringing or reflections on the bus.

U.S. Pat. No. 8,593,202 provides a method of suppressing ringing by monitoring the signals on the CAN bus itself. When a state change on the bus is detected, a switch is closed for a fixed period of time to provide a lowering of impedance on the bus.

SUMMARY

According to a first aspect, there is provided a circuit comprising: a first input coupled to a transmit data input of a bus transceiver; and a first output coupled to a bus; wherein the circuit is configured to be coupled in parallel with the bus transceiver and configured to, in response to a dominant to recessive transition on the transmit data input, lower an impedance of the bus.

The impedance may be a differential impedance of the bus. The bus may be a CAN bus. Lowering the impedance of the bus may comprises the circuit being configured to output a first drive signal to drive the bus to a low impedance state. The circuit may comprise: a controller configured to detect the transition on the transmit data input; and a transmitter configured to output a first drive signal in response to the detected transition.

The controller may be coupled to the transmit data input. The transmitter may be coupled to the bus in anti-phase to the coupling of a transmitter of the bus transceiver to the bus. The transmitter may be configured to drive the bus in an opposite polarity to a transmitter of the bus transceiver circuit. The first drive signal may correspond to a drive current output by the transmitter. In response to the transition on the transmit data input, the controller may be configured to control the transmitter to transition the first drive signal between a first value and a second value.

The first value may correspond to a value of a second drive signal output by the bus transceiver when the bus is in a recessive state. The first value may be substantially 0. The second value corresponds to a third value that is the value of the second drive signal output by the bus transceiver when the bus is in a dominant state, where the second and third values have equal magnitude but opposite polarity. The controller may be configured to control the transmitter to transition the first drive signal between the first value and the second value for a first period of time in response to the transition.

The first period of time may correspond to a period of time taken for the second drive signal to transition between the third value and the first value in response to the transition on the transmit data input. The controller may be further configured to control the transmitter to output the first drive signal at the second value for a second period of time. The controller may be further configured to control the first drive signal to transition from the second value towards the first value at a first rate of change. The first rate of change may be configured to be less than a rate of change that would cause ringing.

The first rate of change may be selected so that a time taken for the first drive signal to transition between the second value and the first value is less than 25% of a propagation delay of the bus. The second drive signal has not reached the first value by a next transition on the transmit data input, the controller may be configured to control the first drive signal to transition between its current value and the first value in a third time period. The next transition may be a recessive to dominant transition. The third time period may correspond to a period of time taken for the second drive signal to transition between the first value and the second value in response to the next transition.

According to a second aspect, there is provided an apparatus comprising: a bus transceiver coupled to receive a transmit data input and to provide a drive signal to a bus; and the circuit of the first aspect.

FIGURES

Embodiments will be described, by way of example only, with reference to the drawings, in which.

It will be appreciated that for features that span more than one drawing like reference numerals indicate the like feature.

DETAILED DESCRIPTION

Figure 1:
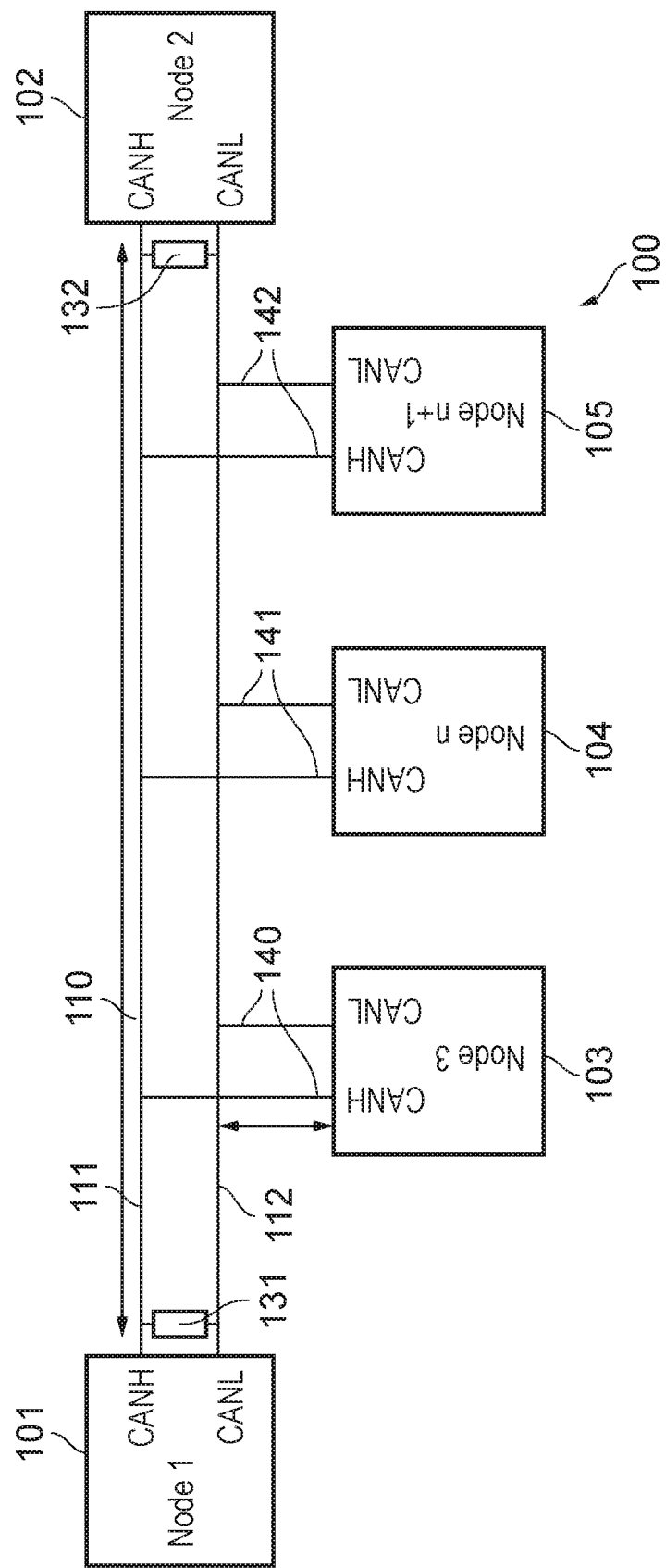
FIG. 1 is a schematic diagram showing an example of a CAN bus network with multiple nodes.

FIG. 1 shows an example of a network 100 comprising a plurality of nodes coupled together via a CAN bus.

The network 100 comprises a first node 101, a second node 102, a third node 103, an $n^{th}$ node 104 and an $(n+1)^{th}$ node 105. The nodes 101 to 105 are coupled together for communication by a CAN bus 110. The CAN bus 110 is a two wire bus comprising a CANH wire 111 and a CANL wire 112. In this case, the wires 111 and 112 form a twisted pair having a nominal line impedance. Each of the nodes 101 to 105 is coupled to the CANH 111 and CANL 112 wires.

In this example the nominal line impedance is 120Ω, which is typical of some automotive applications of the CAN bus. It will however be appreciated that embodiments are applicable to other line impedances. It will also be appreciated that the exact impedance of the line may be affect by physical factors such as the cable and/or isolation material. While line impedance is assumed to be 120Ω, the actual line impedance may vary around this value and can be considered to be approximately 120Ω. Similarly, the termination resistors may vary as to their exact value due to real-world implementation.

The first node 101 is a first end node of the bus 110 and has a termination resistance 131 of 120Ω. It will be appreciated that 120Ω is in accordance with this example of cable impedance. The second node 102 is a second end node and has a termination resistance 132 of 120Ω. The third, $n^{th}$ and $(n+1)^{th}$ nodes are intermediate nodes and are coupled to the CAN bus 110 via stubs 140, 141 and 142. Such intermediate nodes may be unterminated or optionally applied with a high ohmic termination in the kilo-Ohms range in some systems. In some examples, high ohmic termination may provide limited ringing suppression at these quasi open ends of the cable, but the effectiveness is very limited due to the deviation from the nominal cable impedance.

Each of the nodes may be coupled to further circuity, such as sensors or microcontrollers, that may be configured to communicate with one or more of the other nodes using the CAN bus 110.

Figure 2:
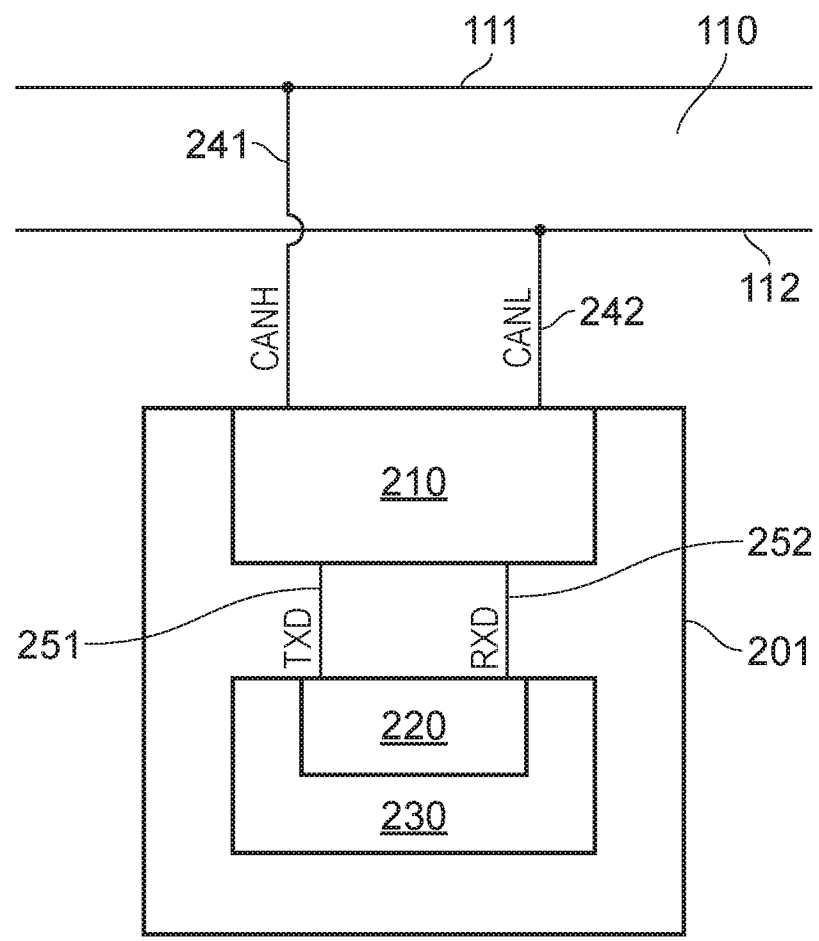
FIG. 2 is a schematic diagram of a node according to an example.

FIG. 2 shows an example of a node 201, for example one of the nodes 101 to 105 in more detail.

Node 201 is coupled to the CAN bus 110 with a stub 241 coupled to the CANH wire 111 and a stub 242 coupled to the CANL wire 112. The stubs 241, 242 are coupled to a CAN bus transceiver 210 of the node 201. It will be appreciated, that in the case where stubs are not needed, for example for an end node, the CAN bus transceiver will be coupled directed to the wires 111 and 112.

The CAN bus transceiver 210 is coupled to a CAN controller 220 via a transmit data connection (TXD) 251 and a receive data connection (RXD) 252.

The CAN controller 220 may form part of a microcontroller 230 of the node 201.

The microcontroller 230 may determine messages that are to be transmitted on the bus and provide these to the CAN controller 220. The microprocessor may receive messages from the bus from the CAN controller 220 and interpret them. The microcontroller 230 may be further connected to other entities, such as sensors or actuators and provide an interface between them and the bus.

The CAN controller 220 may receive bits from the bus (via the bus transceiver 210) and reconstruct the bits into a message to be interpreted by the microcontroller. The CAN controller may receive a message from the microcontroller 230 and provide it as serial bits to the bus via the CAN transceiver 210.

The CAN transceiver 210 may convert the digital data bits on the TXD pin 251 from the CAN controller 220 into analogue bus signals. The CAN transceiver 210 may further convert the analogue bus signals into digital bits to be provided via the RXD pin 252 to the CAN controller 220.

The implementation of the network 100 may be governed by certain parameters in order to reduce ringing and protect the integrity of the signalled data at higher data rates. For example, the CAN bus 110 may have a maximum length at which maximum data rates may be achieved. In another example, the stubs 140, 141 and 142 connecting the intermediate nodes 101 to 105 to the CAN bus 110 may be kept as short as possible to reduce reflections. In one case, the maximum length of the CAN bus may be restricted to 40 m and the stubs to less than 0.3 m, however it will be appreciated that this is by way of example.

Despite this requirement, the length of the bus and the stubs may be subject to other factors. For example, in an automotive application for example, the implementation of the CAN bus network may be governed by the shape and size of a vehicle and position of the nodes. It may not always be possible to have stubs that are as short as desired. Furthermore, even in the case of the stubs being as short as is practical, ringing may still occur at higher data rates.

The ringing in the unterminated stub lines may corrupt the communication on the bus. This becomes more of a problem with new protocols, for example CAN FD, where the data rate is higher. One way to address ringing is to redesign network topology in order to improve termination, however this is time consuming and costly.

Embodiment of the present application provide a method of supressing ringing that may be implemented on existing network topologies. Furthermore embodiments may take into account the speed at which this suppression is implemented and mitigate the potential of glitches occurring in ringing suppression circuits.

Figure 3:
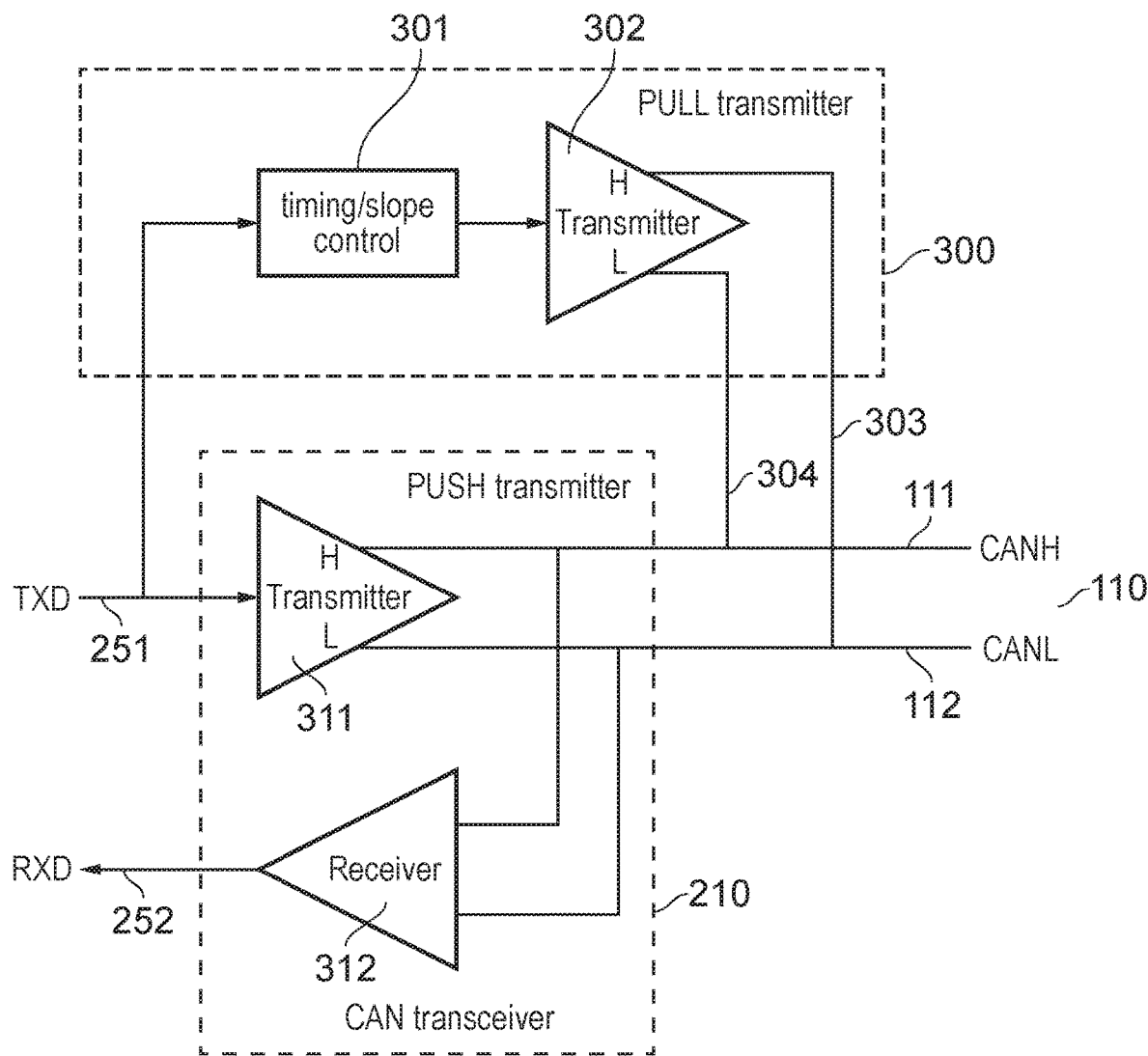
FIG. 3 is a schematic diagram showing a bus transceiver and circuit in accordance with an embodiment.

FIG. 3 shows a ringing suppression circuit 300 according to an embodiment. The circuit of FIG. 3 may be implemented as part of a CAN transceiver and a CAN transceiver 210 has been shown in the figure.

The CAN transceiver 210 of FIG. 3 is coupled to a transmit data input pin (TXD) 251 and a received data output pin (RXD) 252. It will be appreciated that in some example the TXD 251 and RXD 252 may be connections to a CAN controller, for example CAN controller 220. The TXD 251 may be connected to receive data to be transmitted on the bus and the RXD 252 may be connected to provide data that was received on the bus.

The CAN transceiver 210 is further coupled to a first CANH wire 111 of the CAN bus 110 and a second CANL wire 112 of the CAN bus 110. The CAN transceiver 210 may comprise a transmitter 311 with an input coupled to the TXD 251 and a differential output coupled to the CANH 111 and CANL 112. In some examples the transmitter 311 may be an amplifier. The CAN transceiver 210 may further comprise a receiver, for example receive comparator 312, with an output coupled to the RXD 252 and a differential input coupled to the CANH 111 and CANL 112.

FIG. 3 further shows a ringing suppression circuit 300 coupled to the TXD 251 and the CANH 111 and CANL 112. The circuit 300 comprises a controller 301 and a transmitter 302. In this example, the transmitter 302 may be a differential amplifier. An input to the controller 301 is coupled to the TXD 251 and an output of the controller 301 is coupled to an input of the transmitter 302. An output of the transmitter 302 is coupled to the CAN bus 110. In this example, the transmitter 302 output comprises a first output 303 coupled to the CANL 112 and a second output 304 coupled to the CANH 111. The transmitter 303 of the circuit 300 may be coupled to the bus in an opposite polarity to the transmitter 311 of the bus transceiver 210. For example while a high output of transmitter 311 is coupled to the high wire of the bus CANH, the high output of transmitter 302 is coupled to the low wire of the bus CANL. Similarly, while a low output of transmitter 311 is coupled to the low wire of the bus CANH, the low output of transmitter 302 is coupled to the high wire of the bus CANL. In this sense, the transmitter 311 may be considered to be a push transmitter and the transmitter 302 may be considered to be a pull transmitter.

In operation, the push transmitter 311 of the bus transceiver 210 is configured to either drive the bus to a dominant state or return the bus to a passive recessive state. The operation of the push transmitter 311 is in response to an input signal received on TXD 251. In this example, when the TXD input 251 is a logical '0', the push transmitter 311 is configured to drive the bus 110 to a dominant state. When the TXD input 251 is a logical '0', the push transmitter 311 is configured to return the bus to a passive recessive state. When the push transmitter 311 drives the bus to a dominant state, the transmitter 311 actively drives the bus by outputting a drive current on the bus to correspond to a dominant state. When the push transmitter 311 returns the bus to the recessive state, it reduces its drive current to a reference value, in some examples zero.

When the bus is in a passive recessive state, the impedance on the bus is determined by the termination resistors in the network which is typical total 60 ohm. When the bus is in a dominant state, the impedance on the bus is determined by the transmitter 311 output stage which drives the bus low ohmic.

The ringing on the bus may be somewhat supressed by the transmitter when the bus transitions from a recessive to a dominant state. In contrast, ringing may become more obvious when the bus transitions from a dominant to a recessive state.

The transmitter 302 (pull transmitter) of the ringing suppression circuit may be configured to drive the bus to an active-recessive state in response to a dominant to recessive transition on the TXD input 251. The pull transmitter 302 may have its outputs connected to the bus 110 in an opposite phase to the push transmitter 301. In other words, drive current of the pull transmitter 302 may be the opposite polarity to the drive current of the push transmitter 301.

The transition may correspond a dominant to recessive state transition on the bus. In this example, a transition from a logical '0' to a logical '1' on the input signal at TXD 251 corresponds to a dominant to recessive state transition on the bus. It will however be appreciated that in other implementations a logical '1' to logical '0' transition on TXD 251 may correspond to a dominant to recessive state transition on the bus.

In response to a dominant to recessive transition on TXD 251, the controller 301 may control the pull transmitter 302 to drive the bus to an active recessive state. In the active-recessive state, the impedance of the CAN bus 110 is lowered with the aim of reducing any potential reflection at the unterminated node. The pull transmitter may output a drive current to drive the bus to an active recessive state. Because the pull transmitter 302 is coupled to the bus with an opposite to polarity than the push transmitter 311, the pull transmitter drive current has an opposite polarity to the push transmitter drive current. The pull transmitter drive current may start to reduce the bus voltage to pull the bus into the active recessive state.

Figure 4:
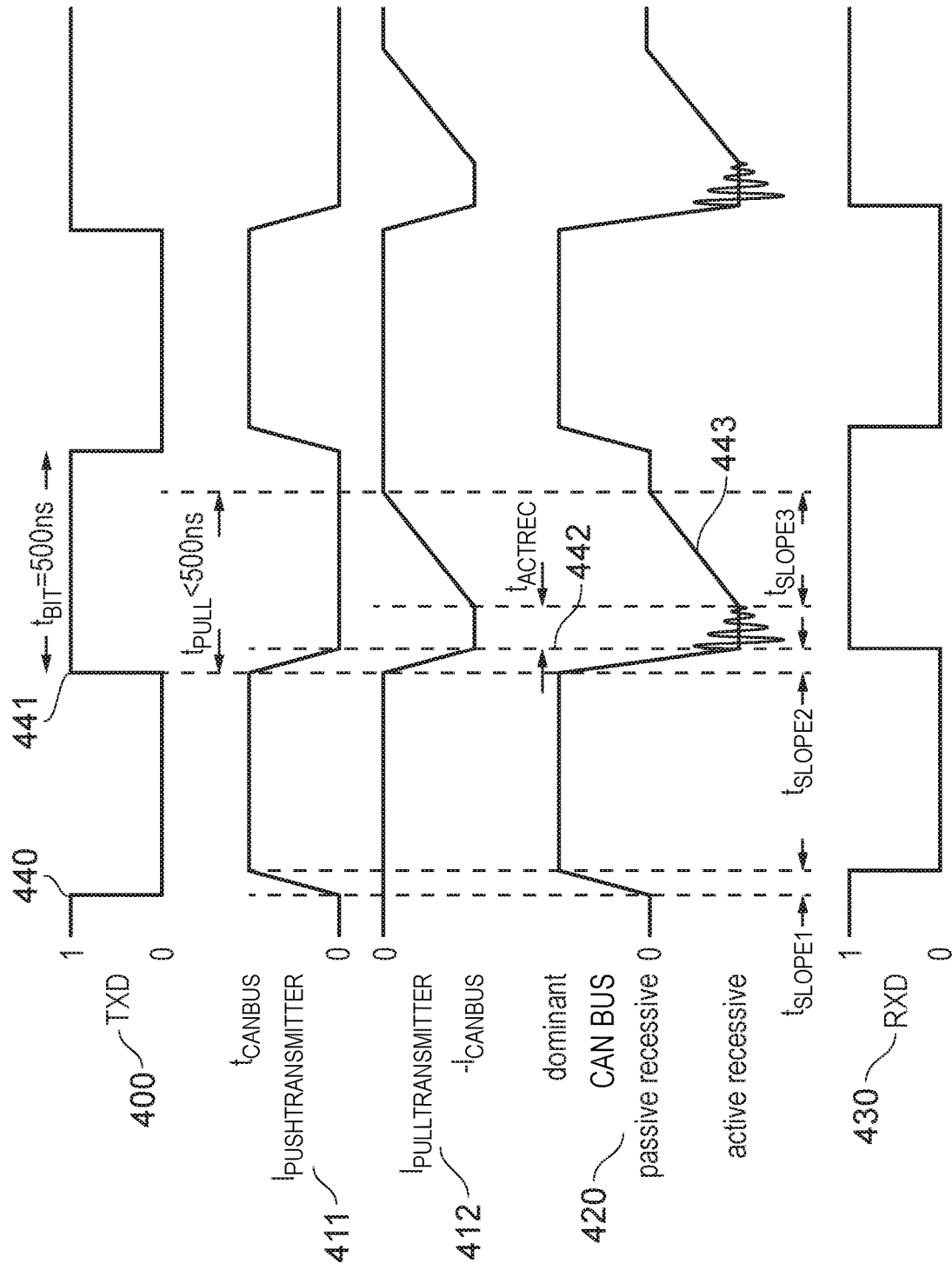
FIG. 4 is a signalling diagram showing an example operation of an embodiment.

An example of the operation of the circuit 300 is shown in FIG. 4. In the example of FIG. 4, the bus transmits in a data phase having a data rate of 2 Mbits/s, however it will be appreciated that this is by way of example only and other data rates are possible in a data phase of operation.

FIG. 4 shows a signal 400 of bits provided from the CAN controller to the CAN transceiver at connection TXD 251. In this example the time taken to transmit a bit $t_{BIT}$ is 500 ns corresponding to a data rate of 2 Mbits/s, however it will be appreciated that this is an example only. It will be appreciated that the time taken to transmit a bit $t_{BIT}$ corresponds to the data rate of the CAN bus. In this case the data rate corresponds to a bit rate of $t_{BIT}$ of 500 ns, however the data rate can change with the operation of the CAN bus. In this example, a logical '0' on the signal 400 corresponds to a dominant state to be output on the bus and a logical '1' corresponds to a recessive state to be output on the bus.

A drive signal 411 of the push transmitter 311 is shown. In this example, the drive signal 411 corresponds to a drive current of the push transmitter 311. The drive current 411 varies between a reference value, for example zero, and a positive value $I_{CANBUS}$, where the reference value corresponds to the push transmitter 311 not driving the bus (not providing a drive signal) and $I_{CANBUS}$ corresponds to the push transmitter 311 driving the bus to a dominant state.

A drive signal 412 of the pull transmitter 302 is shown. In this example, the drive signal 412 corresponds to a drive current of the pull transmitter 302. The drive current 412 varies between the reference value, for example zero, and a negative value $-I_{CANBUS}$, where the reference value corresponds to the pull transmitter 302 not driving the bus and $-I_{CANBUS}$ corresponds to the push transmitter 302 driving the bus to an active-recessive state. It will be appreciated that the positive drive current 411 value $I_{CANBUS}$ and the negative drive current 412 value $-I_{CANBUS}$ in this example may be equal in magnitude but of opposite polarity.

The drive currents are described as varying between a reference value and $I_{CANBUS}/-I_{CANBUS}$. The reference value has been given as being equal to zero in some examples. It will be appreciated that the reference value may take on other values. For example, there may be a current offset in the system in which case the current will vary between zero+/−the offset, $I_{CANBUS}$+/−offset and $-I_{CANBUS}$+/−the offset.

A signal 420 on the CAN bus is shown. The CAN bus signal varies between a maximum value (dominant) and minimum value (active recessive). It will be appreciated that these values may have opposite polarity and equal magnitude with the reference value between them. When the CAN bus signal 420 is positive (dominant), a dominant state is asserted and when the CAN bus signal 420 is at the reference value (in this example around zero current) the bus is in a passive-recessive state. When the CAN bus signal 420 is negative (active recessive), an active recessive state is asserted on the bus.

A signal 430 shows the bits received on the bus by the CAN bus transceiver and provided to the CAN controller over connection RXD 252.

In operation, the CAN bus controller 220 provides a serial bit stream 400 to the CAN transmitter 411 for transmission on the bus. Prior to time 440, the bus 420 is in a passive recessive state with neither the push transmitter 311 nor the pull transmitter 302 asserting a drive signal on the bus.

At time 440, the TXD input signal 400 transitions from a logical '1' to a logical '0'. In response, the drive current 411 of the push transmitter 311 starts to transition from 0 to $I_{CANBUS}$ in order to drive the bus to a dominant state. The time taken for the drive current 411 to transition from 0 to $I_{CANBUS}$ is shown as $t_{SLOPE1}$. The controller 301 may monitor the transitions on the TXD 251 and in this embodiment does not respond to a recessive to dominant transition. In response to the drive current 411, the state of the bus transitions from a passive recessive state to a dominant state.

At time 441, the TXD signal 400 transitions from a logical '0' to a logical '1'. The push transmitter 311 responds to this input 400 by transitioning its drive current from $I_{CANBUS}$ to 0. The time taken for the drive current 411 to transition from $I_{CANBUS}$ to 0 is $t_{SLOPE2}$.

The controller 301 may monitor the TXD signal 400 in pin 251 and detect the transition at time 441. In response, the controller 301 may control the pull transmitter 302 to drive the bus 110 to an active recessive state. The controller 301 may control the transmitter 302 to transition the drive signal 412 from 0 to $-I_{CANBUS}$. The controller may further control the transition of the drive signal 412 to take place during the time period $t_{SLOPE2}$. The addition of the drive current 412 pulling the bus to an active recessive state may reduce the impedance on the bus.

The controller 301 may control the pull transmitter 302 to keep the drive current at $-I_{CANBUS}$ for a period of time $t_{ACTREC}$, after which the drive current 412 may transition back towards 0. The time taken for the drive current 412 to transition back towards 0 may be controlled by the controller and be $t_{SLOPE3}$. The time $t_{SLOPE3}$ may correspond to a rate of change of the drive signal 412. This rate of change may be selected to provide a gradual transition to mitigate the transition of the drive signal 412 causing further ringing.

The rate of change corresponding to $t_{SLOPE3}$ is thus slower compared to a rate of change of $t_{SLOPE1}$ and $t_{SLOPE2}$ in order to attempt to mitigate any new reflection on the CAN bus. In some examples, this rate of change may be set with respect to the cable wire delay or propagation delay of the bus, which corresponds to the length of the bus. For example, the rate of change may be set so that the cable wire delay is less than 25% of the slope time, however it will be appreciated that this is an example only and the percentage may be determined by testing the system for a value where any ringing caused by the transition is less than an acceptable threshold for that bus system. As a specific example, a 10 meter CAN bus wiring cable times ~5 ns/m calculates a propagation delay of 50 ns. In this case the slope time $t_{SLOPE3}$ may be selected to be slower than 250 ns.

At the end of $t_{SLOPE3}$, the drive current 412 may be zero and the pull transmitter 302 may be in a high-ohmic state. During the time $t_{SLOPE3}$, the CAN bus 420 may transition between an active recessive state and a passive recessive again. It will however be appreciated that in some examples, the bus may be operated at a faster data rate than that given in FIG. 3. In this case $t_{SLOPE3}$ may not provide enough time for the pull transmitter drive current 412 to transition from $-I_{CANBUS}$ back to zero.

The sum of the time for which the bus is in an active recessive state including a transition time of the bus from the dominant to active recessive state is given by $t_{PULL}$.

$$t_{PULL}=t_{SLOPE2}+t_{ACTREC}+t_{SLOPE3}$$

It will be appreciated that it may be optional to keep the drive current 412 equal to $-I_{CANBUS}$ for a period of time ($t_{ACTREC}$) and in some cases $t_{ACTREC}$ may be zero. $t_{PULL}$ may be set to be less than a bit time $t_{BIT}$. At some data rates, this may allow that the bus is returned to a passive recessive state or that the drive currents are at a reference value at the time of the next transition. It will be appreciated that because the rate of change of the transition in some example is set according to the propagation delay, in some cases where a bus is being operated at a faster data rate, the bus may not be returned to a passive recessive state before the next transition. In examples, depending on the network topology the parameters $t_{ACTREC}$ and $t_{SLOPE3}$ can be chosen such that the ringing is suppressed most effectively. For example the $t_{PULL}$ of 500 ns can be divided between $t_{ACTREC}$=50 ns and $t_{SLOPE3}$=450 ns, or between $t_{ACTREC}$=100 ns and $t_{SLOPE3}$=300 ns.

In response to detecting a dominant to recessive transition on the TXD signal 400, the controller 301 controls the pull transmitter 302 to output a drive signal 412 that transition from the recessive value (in this case 0) to $-ICANBUS$. This transition takes place during a first time period $t_{SLOPE2}$. This period is defined as the time taken for the drive signal 411 output from the push transmitter 302 to transition from $I_{CANBUS}$ to the recessive value (in this example 0) in response to the transition at 441.

At the end of $t_{SLOPE2}$, the controller may cause the pull transmitter to keep the drive signal 412 at $-I_{CANBUS}$ for a second period of time. As discussed this is optional and in some embodiments, the drive signal 412 may immediately start to transition from $-I_{CANBUS}$ towards the recessive value. The slope or rate of change of the drive signal 412 during this transition may be set with respect to a propagation delay of the bus itself. In this example, the relationship between the propagation delay and rate of change of the signal may influence ringing. In a specific example, the rate of change of the transition may be set to be less than 20% of the propagation delay of the bus.

In the example of FIG. 3, the bus is being operated at 2 Mbits/s which results in a $t_{BIT}$ of 500 ns. In this example, the transition of the drive signal 412 between $-I_{CANBUS}$ and the recessive value is complete before the end of a bit time $t_{BIT}$. In this case, the drive signal 412 remains at the recessive value until a next transition on the TXD signal 400.

Figure 5:
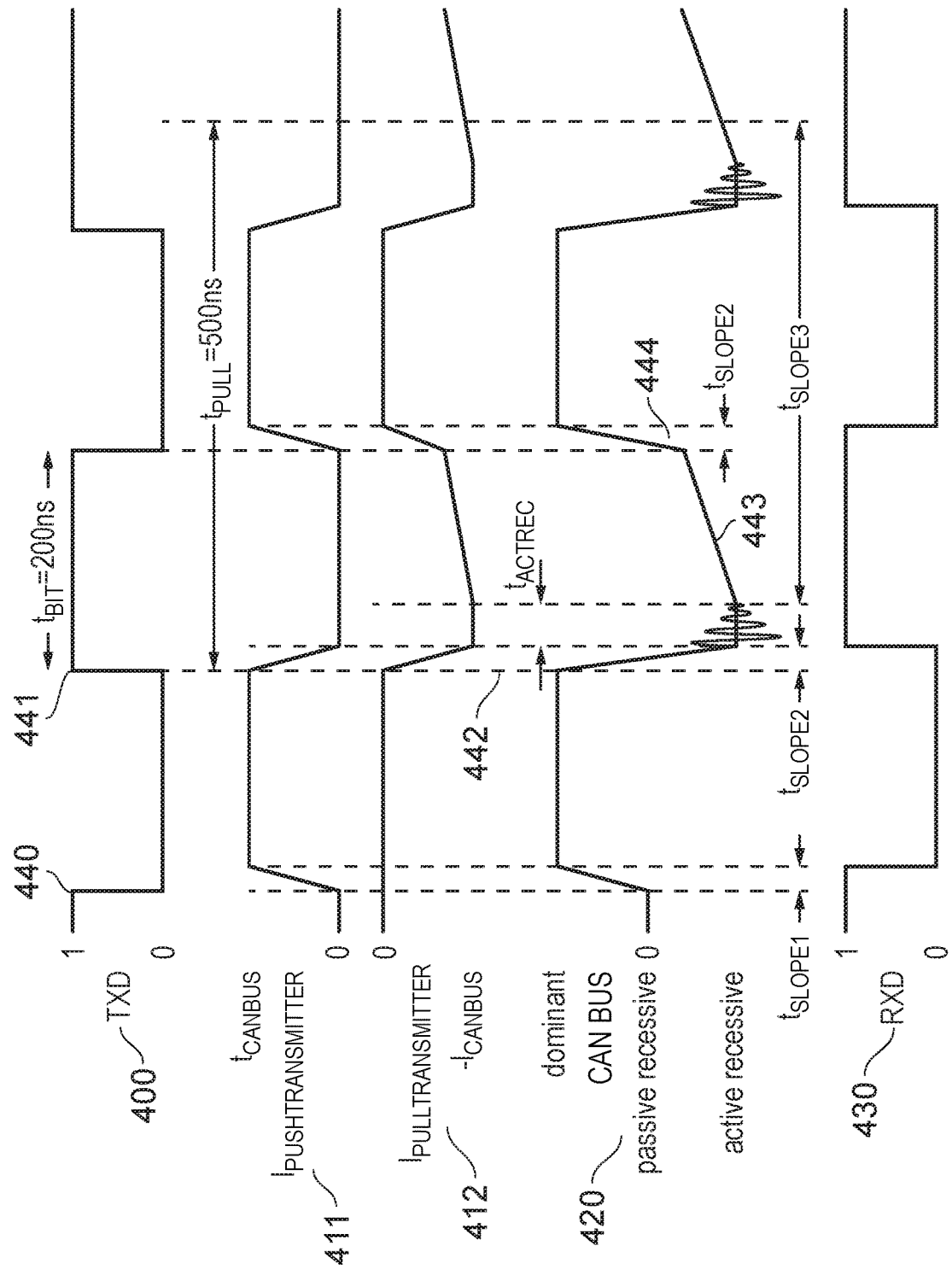
FIG. 5 is a signalling diagram showing a further example of operation of an embodiment.

It will however be appreciated that the bus may be operated at different data rates. For example, the bus may be operated at a faster data rate than shown in FIG. 4 in some implementations. While the time $t_{SLOPE2}$ is dependent on the transition time of the push transmitter drive signal 411, the rate of change at 443 is set based on the propagation delay. In this case, for faster data rates, the pull transmitter drive signal 412 may not have reached the recessive value by the end of a bit time $t_{BIT}$. FIG. 5 shows this case.

Similarly to FIG. 4, FIG. 5 shows a data transmit signal 400, an output drive signal 411 of the push transmitter 311, an output drive signal 412 of the pull transmitter 302, the CAN bus signal 420 and a signal received from the bus at the bus transceiver 430. The operation of the example of FIG. 5 is similar to that of FIG. 4 except that the bus of the example of FIG. 5 operates at a faster data rate than that of FIG. 4. In this example, the bus may be operated at 5 Mbit/s having a bit time $t_{BIT}$ of 200 ns.

In response to a dominant to recessive transition of the TXD signal at 400, the pull transmitter drive signal 412 may transition from a recessive vale to $-I_{CANBUS}$ over a period $t_{SLOPE2}$. The period $t_{SLOPE2}$ may be set to the period taken by the push transmitter drive signal 411 to transition between $I_{CANBUS}$ and the recessive value. The pull transmitter drive signal 412 may be held at $-I_{CANBUS}$ for a period $t_{ACTREC}$ before transitioning towards the recessive value. Because the data rate has increased, the pull transmitter drive signal may not have reached the recessive value by the end of the $t_{BIT}$ and before the next transition on the TXD signal.

In this case, the controller may control the pull transmitter drive signal 412 to transition between its current value and $I_{CANBUS}$ in a third time period. The third time period may correspond to the time taken for the push transmitter drive signal to transition between the recessive value $I_{CANBUS}$. It will be appreciated that the next transition on the TXD signal 400 may be a transition from recessive to dominant.

In this example, at the transition from recessive to dominant the pull transmitter 302 is still driving current on the CAN bus. The controller 301 may detect the transition on the TXD pin and will change the transition from $t_{SLOPE3}$ to $t_{SLOPE2}$.

In examples of the application, a ringing suppression circuit responds to a dominant to recessive transition on a transmit data input pin 251 to a CAN bus transceiver. Each node of the system may have a ringing suppression circuit coupled to it. In this case, the ringing suppression circuits of each of the nodes may be reacting to different signals as opposed to a signal transition on the bus itself. In particular, this issue may arise in a scenario in which or more nodes (or bus transceivers) are active on the bus at the same time.

In a first case, two or more nodes (bus transceivers) may be active on the bus but be transmitting the same data. After the two or more nodes transmit a dominant to recessive transition, the ringing suppression circuitry of the two or more nodes will attempt to assert an active recessive state. In this case, the effect may be similar to if only one node was active.

In a second case, two or more nodes may be active on the bus but may transmit different data. In this scenario a first plurality of nodes transmit a bit corresponding to a recessive state and a second plurality of nodes transmit a bit corresponding to a dominant state. The ringing suppression circuits of the nodes transmitting a recessive bit will try to assert an active recessive state. This may lead to the voltage on the bus being undefined because impedance on the bus may be lowered. However, in embodiments, the period of time for which the bus voltage may become undefined does not overlap with a time at which the bus is sampled by the nodes for a receive signal. This is described in relation to FIG. 6.

Figure 6:
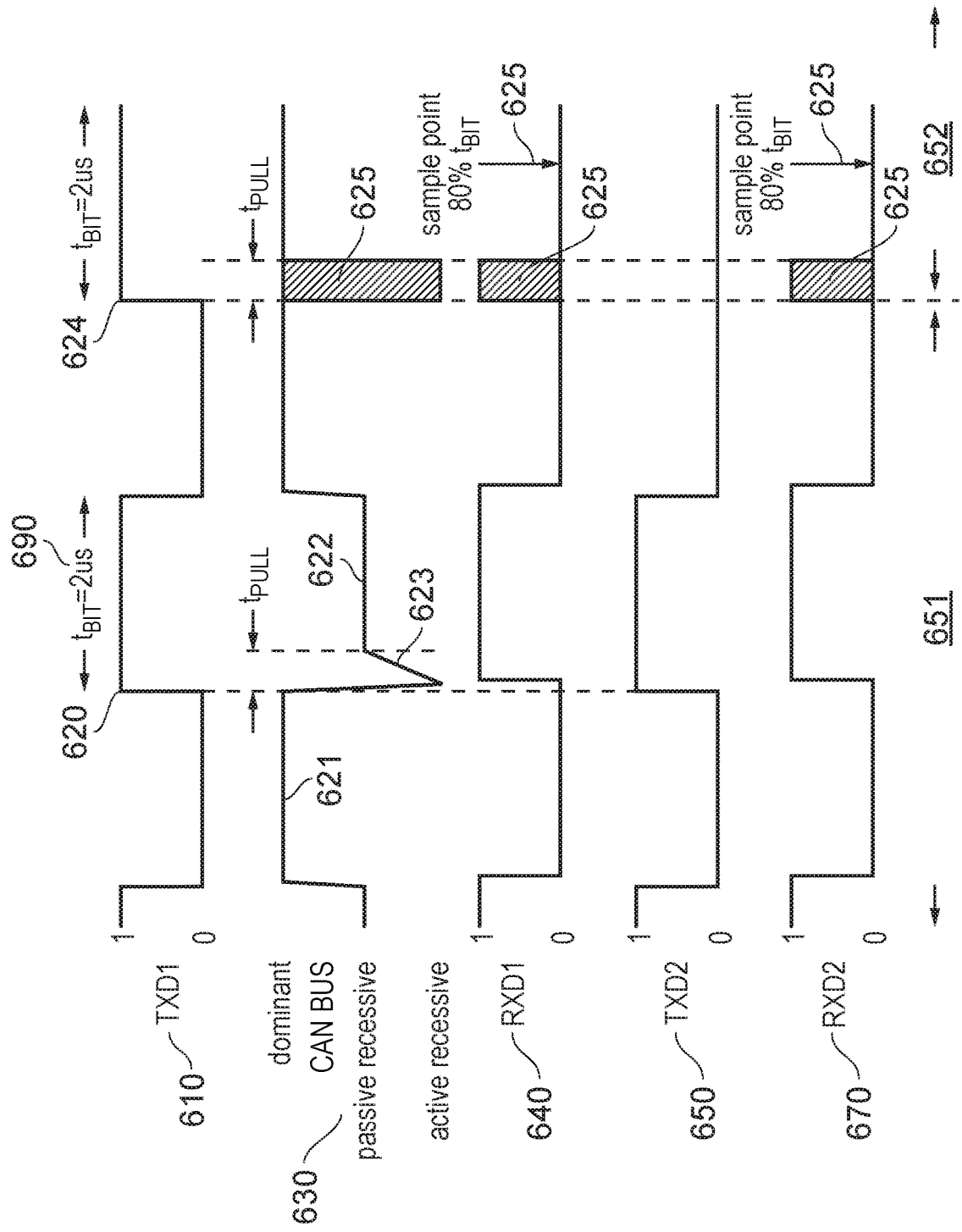
FIG. 6 is a signalling diagram showing a further example of operation of an embodiment.

In these three scenarios, the data rate on the bus corresponds to an arbitration speed of an arbitration phase which is slower than a data rate of a data phase of the bus. FIG. 6 shows an example of multiple bus transmitters being active on the bus according to one or more of these scenarios.

FIG. 6 is a signalling diagram showing the signalling of a first and second bus transceiver and associated ringing suppression circuitry. FIG. 6 shows a first scenario 651 where the first and second bus transceivers are both active and transmitting the same data. FIG. 6 also shows a second scenario 652 where the first and second transceivers are both active and transmitting different data.

For the first transceiver and associated ringing suppression circuitry, a transmit data pin signal (TXD1) 610 and receive data pin signal (RXD1) 640 is shown. It will be appreciated that these signals may be the signals present on the transmit data input pin 251 and the receive data output pin 252 of the first bus transceiver 210.

For the second transceiver and associated ringing suppression circuitry, a transmit data pin signal (TXD2) 650 and receive data pin signal (RXD2) 670 is shown. It will be appreciated that these signals may be the signals present on the transmit data input pin 251 and the receive data output pin 252 of the second bus transceiver 210.

A signal (CAN BUS) 630 is also shown. This signal is the signal on the CAN bus itself.

From FIG. 6, it can be seen that for a first period 651, TDX1 610 and TDX2 650 are transmitting the same data. In this case both the first and second bus transceivers are active and transmitting (or attempting to transmit) the same data on the bus. At time 620, the signal TXD1 610 at the first bus transceiver and the signal TXD2 650 at the second bus transceiver both transition from low to high providing a dominant to recessive edge. The respective bus transceivers convert TXD1 and TXD2 for output on the CAN bus. The ringing suppression circuit at the first bus transceiver detects the transition on TXD1 610 and the ringing suppression circuit at the second bus transceiver detects the transition on TXD2 650. In response to the detection of the edge, the respective pull transmitters of the first and second ringing suppression circuits transition their drive signals to provide an active recessive state. The CAN bus 630 transition from dominant state 621 to a passive recessive state 623 via an active recessive state 623 cause by the pull transmitter drive signals.

It will be noted that the bit rate of the example of FIG. 6 is given as the arbitration bit rate. This is because the scenarios in which more than one bus transmitter is active at the same time occur all corresponds to the arbitration bit rate rather than the (faster) data bit rate. The inventors have identified three scenarios in which more than one bus transmitter may be active simultaneously.

There are three scenarios in the CAN/CANFD protocol in which two or more transmitters may be active on the CAN bus at the same time.
1) During an arbitration phase which may occur at the start of each CAN frame to determine the node which is allowed to transmit. In this example, the practical arbitration speed is 500 kbit/s, which gives rise to $t_{BIT}$=2 us
2) During an error frame. At any moment in time a node is allowed to interrupt the communication to signal an error has being detected. The interrupting node in this example will send six dominant bits at arbitration speed (for example, 500 kbit/s with $t_{BIT}$=2 us)
3) During acknowledge bit. All nodes except the sending node of a finished message may send a dominant ACK bit to the bus to signal the proper format of the sent CAN frame. This take place at arbitration speed (500 kbits/s with $t_{BIT}$=2 us).

In this example the arbitration bit rate is given as 500 kbit/s with the bit time $t_{BIT}$ 690 being 2 us. This is by way of example only and the values of the arbitration rate may change. However, it will be appreciated that the arbitration bite rate is always slower than the data phase bit rate.

In this example, the bus may be in an active recessive state 623. It can be seen that the period of time for which the bus is in an active recessive state is a smaller percentage of the $t_{BIT}$ time than in the examples given where the bus is operating in the data phase at faster data rates.

The time period 624 shows a case where the first and second bus transceivers are attempting to transmit different data to the CAN bus. At time 624, the first bus transceiver receives a low to high transition on its TXD pin (TXD1) 610 and the second bus transceiver receives a low on its TXD pin (TXD2) 650. In arbitration, the second bus transceiver gains control of the bus and the signal on TXD2 is converted to bus levels and output to the CAN bus 630 by the second bus transceiver.

However, the ringing suppression circuit of the first bus transceiver detects the transition on TXD1 610 and its pull transmitter outputs a drive signal to drive the bus into an active recessive state. This may lead to an undefined voltage 625 on the CAN bus 630 for the duration of the pull transmitter drive signal of the ringing suppression circuitry associated with the first bus transceiver being less than the recessive value.

As discussed, this scenario occurs during an arbitration phase of operation of the bus, If the voltage on the bus becomes undefined, the period for which the voltage is undefined is small compared to the arbitration phase $t_{BIT}$.

The first and second bus transceivers detect the signals on the bus and provide them to their respective CAN controllers via receive output pin signals RXD1 640 and RXD2 670. RXD1 640 and RXD2 670 show the undefined voltage 625 being provided to the respective CAN controllers. The set period for which the pull transmitter drive signal attempts to drive the bus into an active recessive state is small in comparison with the arbitration bit time and so the period for which the voltage is undefined is small in comparison with $t_{BIT}$. A CAN controller may sample an incoming RXD and this is typically not done at the very start of a bit, but rather between the middle and the end. The CAN controller sampling point of the signals RXD1 640 and RXD2 670 is shown at 625. In some examples the sample time may be at 50% to 80% of the bit time $t_{BIT}$. It can be seen that the signals RXD1 and RXD2 are sampled after any switch is reopened and the voltage on the bus is no longer undefined.

In the foregoing bus states have been described as being dominant, passive recessive and active recessive. The bus may comprise a first 'high' wire CANH and a second 'low' wire CANL. A positive and negative current (which may be provided by a drive current on the bus) is define with reference to a bus load. For example a positive current (for example $I_{CANBUS}$) will flow from CANH through the bus load back into CANL. A negative current (for example $-I_{CANBUS}$) will flow from CANL through the bus back into CANH. This is also what is meant by $I_{CANBUS}$ and $-I_{CANBUS}$ being of opposite polarity.

The bus may be considered to be in a dominant state when a positive drive current ($I_{CANBUS}$) is present on the bus. In the dominant state a differential bus voltage between CANH and CANL may be positive. The bus may be considered to be in a passive recessive state when no current is present on the bus, for example when neither the push transmitter nor pull transmitter are asserting current, in other words when the drive current is substantially zero or at the reference value. In the passive recessive state a differential bus voltage between CANH and CANL may be zero. The bus may be considered to be in an active recessive state when a negative drive current is being asserted on the bus. In the active recessive state a differential bus voltage between CANH and CANL may be negative.

In the foregoing the ringing suppression circuit has been described as being separate to the bus transceiver, it will be appreciated that this is by way of example only and in other cases, the ringing suppression circuitry may form part of the bus transceiver.

In the foregoing reference has been made to an arbitration phase and a data phase of the CAN bus. The access mechanism of the CAN bus is a bitwise arbitration, during this time the bit rate of the bus is reduced. The arbitration bit rate may also be used for example with an error detection. The data rate of the CAN bus is much faster than the arbitration bit rate. For example, while the arbitration bit rate may be in the vicinity of 500 bit/s, the data bit rate may be higher than 2 Mbit/s in some systems. It will be appreciated that the data and arbitration bit rates may differ in different implementations, however the arbitration bit rate is necessarily a fraction of the data bit rate.

In the foregoing, examples have been described with reference to a CAN bus. It will however be appreciated that embodiments may be applicable to other differential or two wire buses where ringing may be an issued. It will also be appreciated that while the foregoing has described a dominant to recessive transition on a TXD pin as a transition from high to low, this is a matter of design and it may be the inverse in some other systems. In one example, embodiments may operate in accordance with CAN FD with the bit time of the data phase corresponding to a bit time of a CAN FD frame.

The invention claimed is:

1. A circuit comprising:
    a first input coupled to a transmit data input of a bus transceiver; and
    a first output coupled to a bus;
    wherein the circuit is configured to be coupled in parallel with the bus transceiver and configured to, in response to a dominant to recessive transition on the transmit data input, lower an impedance of the bus by outputting a negative drive current to the bus.

2. The circuit of claim 1 wherein the negative drive current is a first drive signal to drive the bus to a low impedance state.

3. The circuit of any preceding claim comprising:
    a controller configured to detect the transition on the transmit data input; and
    a transmitter configured to output a first drive signal in response to the detected transition.

4. The circuit of claim 3 wherein the transmitter is coupled to the bus in anti-phase to the coupling of a transmitter of the bus transceiver to the bus.

5. The circuit of claim 3, wherein the transmitter is configured to drive the bus in an opposite polarity to a transmitter of the bus transceiver circuit.

6. The circuit of claim 3 wherein the first drive signal corresponds to a drive current output by the transmitter.

7. The circuit of claim 3 wherein in response to the transition on the transmit data input, the controller is configured to control the transmitter to transition the first drive signal between a first value and a second value.

8. The circuit of claim 7 wherein the first value corresponds to a value of a second drive signal output by the bus transceiver when the bus is in a passive recessive state.

9. The circuit of claim 7 where the second value corresponds to a third value that is the value of the second drive signal output by the bus transceiver when the bus is in a dominant state, where the second and third values have equal magnitude but opposite polarity.

10. The circuit of claim 7 wherein the controller is configured to control the transmitter to transition the first drive signal between the first value and the second value for a first period of time in response to the transition.

11. The circuit of claim 10 wherein the first period of time corresponds to a period of time taken for the second drive signal to transition between the third value and the first value in response to the transition on the transmit data input.

12. The circuit of claim 7 wherein the controller is further configured to control the transmitter to output the first drive signal at the second value for a second period of time.

13. The circuit of claim 7 wherein the controller is further configured to control the first drive signal to transition from the second value towards the first value at a first rate of change.

14. The circuit of claim 13 wherein the first rate of change is configured to be less than a rate of change that would cause ringing.

15. An apparatus comprising:
- a bus transceiver coupled to receive a transmit data input and to provide a drive signal to a bus; and
- a circuit including:
  - a first input coupled to a transmit data input of a bus transceiver; and
  - a first output coupled to a bus;
  - wherein the circuit is configured to be coupled in parallel with the bus transceiver and configured to, in response to a dominant to recessive transition on the transmit data input, lower an impedance of the bus by outputting a negative drive current to the bus.

16. The circuit of claim 15 wherein the negative drive current is a first drive signal to drive the bus to a low impedance state.

17. The circuit of claim 15 further comprising:
- a controller configured to detect the transition on the transmit data input; and
- a transmitter configured to output a first drive signal in response to the detected transition.

18. The circuit of claim 17 wherein the transmitter is coupled to the bus in anti-phase to the coupling of a transmitter of the bus transceiver to the bus.

19. The circuit of claim 17, wherein the transmitter is configured to drive the bus in an opposite polarity to a transmitter of the bus transceiver circuit.

20. The circuit of claim 17 wherein the first drive signal corresponds to a drive current output by the transmitter.

* * * * *